(12) United States Patent
Kang

(10) Patent No.: US 7,761,089 B2
(45) Date of Patent: Jul. 20, 2010

(54) METHOD AND SYSTEM FOR DOWNLOADING DATA

(75) Inventor: Yong Sung Kang, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 11/449,948

(22) Filed: Jun. 9, 2006

(65) Prior Publication Data

US 2006/0280156 A1 Dec. 14, 2006

(30) Foreign Application Priority Data

Jun. 10, 2005 (KR) .................... 10-2005-0049833

(51) Int. Cl.
*H04L 29/06* (2006.01)
*H04M 3/42* (2006.01)
*H04N 7/173* (2006.01)
*H04M 1/00* (2006.01)
*H04B 1/38* (2006.01)

(52) U.S. Cl. .............. 455/414.3; 455/414.1; 455/552.1; 455/556.1; 455/557; 725/87; 725/97; 725/98; 725/99

(58) Field of Classification Search .............. 455/414.3, 455/414.1, 414.2, 410, 411, 552.1, 553.1, 455/556.1, 557; 725/87, 95, 97, 98, 99, 58
See application file for complete search history.

(56) References Cited

U.S. PATENT DOCUMENTS

2003/0208762 A1* 11/2003 Hanai et al. ................... 725/58
2004/0215526 A1* 10/2004 Luo et al. ...................... 705/26
2005/0043020 A1* 2/2005 Lipsanen et al. .......... 455/422.1
2006/0089999 A1* 4/2006 Xiang et al. ................. 709/229

FOREIGN PATENT DOCUMENTS

| CN | 1312990 | 9/2001 |
|---|---|---|
| CN | 1324183 | 11/2001 |
| CN | 1589574 | 3/2005 |
| JP | 2001-103020 | 4/2001 |
| JP | 2004-135346 | 4/2004 |
| KR | 10-2006-4165 | 7/2004 |
| KR | 10-2005-0003715 | 1/2005 |
| KR | 10-2006-0020398 | 3/2006 |
| WO | WO 99/66670 | 12/1999 |
| WO | WO 01/17288 A1 | 3/2001 |
| WO | 01/30074 | 4/2001 |
| WO | WO 03/012623 A2 | 2/2003 |
| WO | WO 2006-107131 A1 | 10/2006 |

\* cited by examiner

*Primary Examiner*—Un C Cho
(74) *Attorney, Agent, or Firm*—Lee, Hong, Degerman, Kang & Waimey

(57) ABSTRACT

A method for downloading high-capacity data of multimedia content data (e.g., MP3, music video, and movie, etc.) in a mobile communication terminal, and a system for implementing the same are disclosed. The method for downloading data in a mobile communication terminal includes the steps of: selecting a desired data over a mobile communication network, and downloading the selected data over a broadcast network. Therefore, a user can download multimedia content data over a data channel of a DMB network, instead of the Internet of a mobile communication network, resulting in reduction of internet charges accumulated when downloading the high-capacity data.

17 Claims, 2 Drawing Sheets

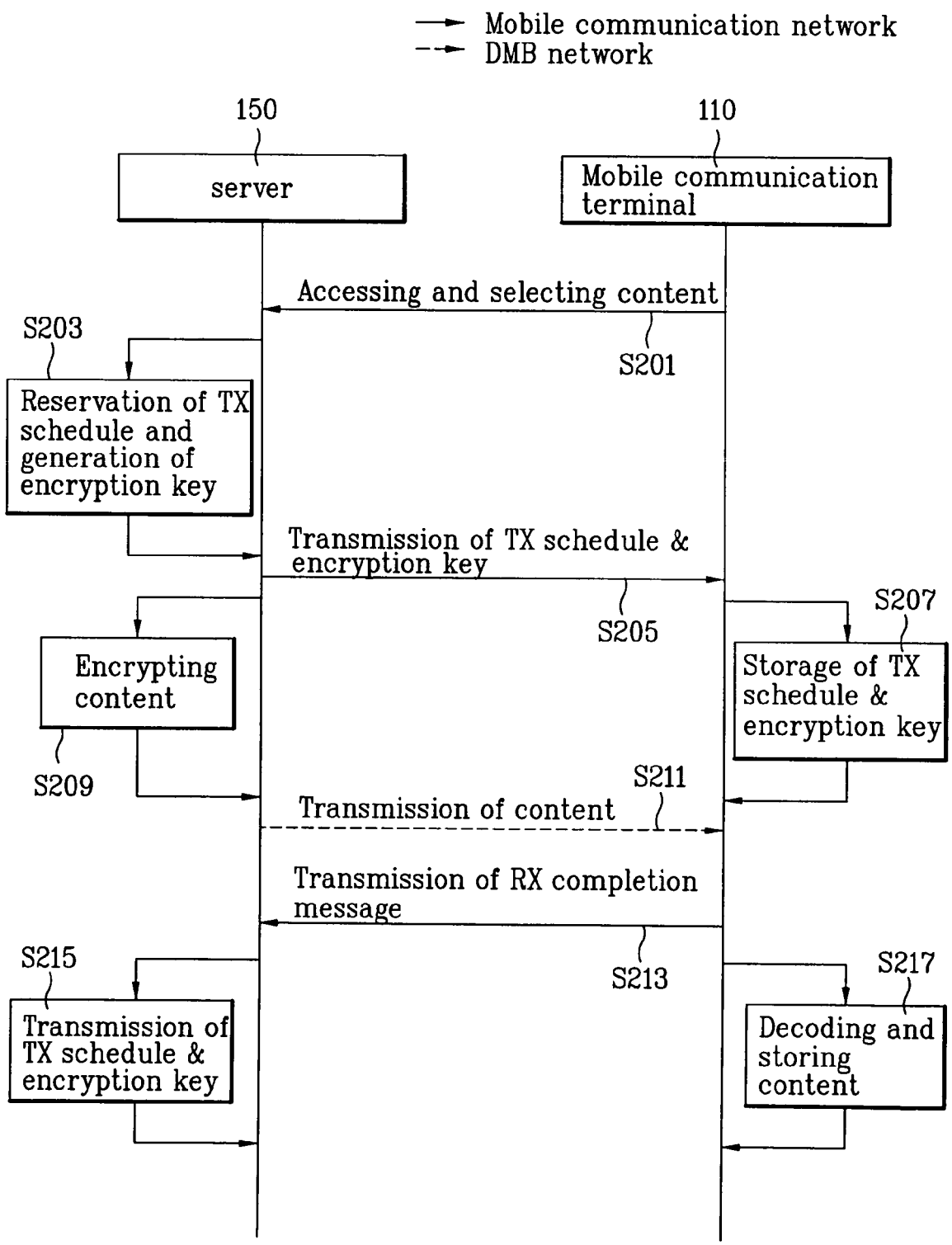

METHOD AND SYSTEM FOR DOWNLOADING DATA

CROSS REFERENCE TO RELATED APPLICATION

This application claims the benefit of Korean Patent Application No. 10-2005-0049833, filed on Jun. 10, 2005, which is hereby incorporated by reference as if fully set forth herein.

BACKGROUND OF THE INVENTION

1. Field of the Invention

The present invention relates to a method and system for downloading data, and more particularly to a method for downloading high-capacity data such as multimedia content data (e.g., MP3, music video, and movie, etc.) in a mobile communication terminal, and a system for implementing the same.

2. Discussion of the Related Art

In recent times, with the increasing development of information communication technologies, information and communication environments have been abruptly changed. Particularly, mobile communication terminals have been considered to be requisites for modern society, and have been widely used throughout the world. With the increasing demands of users due to widespread use of the above-mentioned mobile communication terminals, not only a general voice call function, but also a variety of functions (e.g., a SMS function, and functions for downloading/reproducing multimedia content data, etc.) have been added to the mobile communication terminals.

In association with the function for downloading the multimedia content data, a conventional mobile communication terminal has widely used the Internet over a mobile communication network to download the multimedia content data. However, if a plurality of terminal users simultaneously and frequently download high-capacity multimedia content data, traffic increases due to a limited network bandwidth of the Internet.

Considering the above-mentioned situation, mobile communication service providers have assessed Internet charges, for terminal users, in packet units associated with the traffic caused by multimedia content data.

Therefore, a user who desires to download multimedia content data in his or her mobile communication terminal must unavoidably pay not only a usage fee for desired content data, but also Internet traffic charges for downloading the content data. As a result, teenagers and twenties, who tend to have great desire to download multimedia content data but do not have enough financial ability to pay, may feel a huge economical burden.

A multimedia content provider transmits high-capacity multimedia content data using limited network resources, such that it has difficulty in simultaneously providing many users with the high-capacity multimedia content data.

SUMMARY OF THE INVENTION

Accordingly, the present invention is directed to a method and system for downloading high-capacity data that substantially obviate one or more problems due to limitations and disadvantages of the related art.

An object of the present invention is to provide a method and system for downloading multimedia content data, which allows a user to download desired multimedia content data at lower prices by reducing the double-charging problems, and allows a multimedia content provider to simultaneously provide many more users with the multimedia content data, resulting in increased economical efficiency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for downloading data in a mobile communication terminal comprising the steps of: selecting a desired data over a mobile communication network, and downloading the selected data over a broadcast network.

In another aspect of the present invention, there is provided a method for downloading data comprising the steps of: accessing a server to select a desired data over a mobile communication network by a mobile communication terminal, reserving a transmission schedule of the data by the server, transmitting the selected data over a broadcast network based on the transmission schedule by the server, and receiving the data over the broadcasting network by the mobile communication terminal.

In yet another aspect of the present invention, there is provided a system for downloading data comprising: a server for providing a variety of data, and a mobile communication terminal for accessing to the server to select a desired data over a mobile communication network and downloading the selected data over a broadcast network.

In yet another aspect of the present invention, there is provided a mobile communication terminal for downloading data comprising: a mobile communication module for accessing a server capable of providing the data over a mobile communication network, and selecting a desired data from the server, and a mobile broadcast module for downloading the selected data over a mobile broadcast service network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a flow chart illustrating a method for downloading multimedia content data according to the present invention.

DETAILED DESCRIPTION OF THE INVENTION

Figure 1:
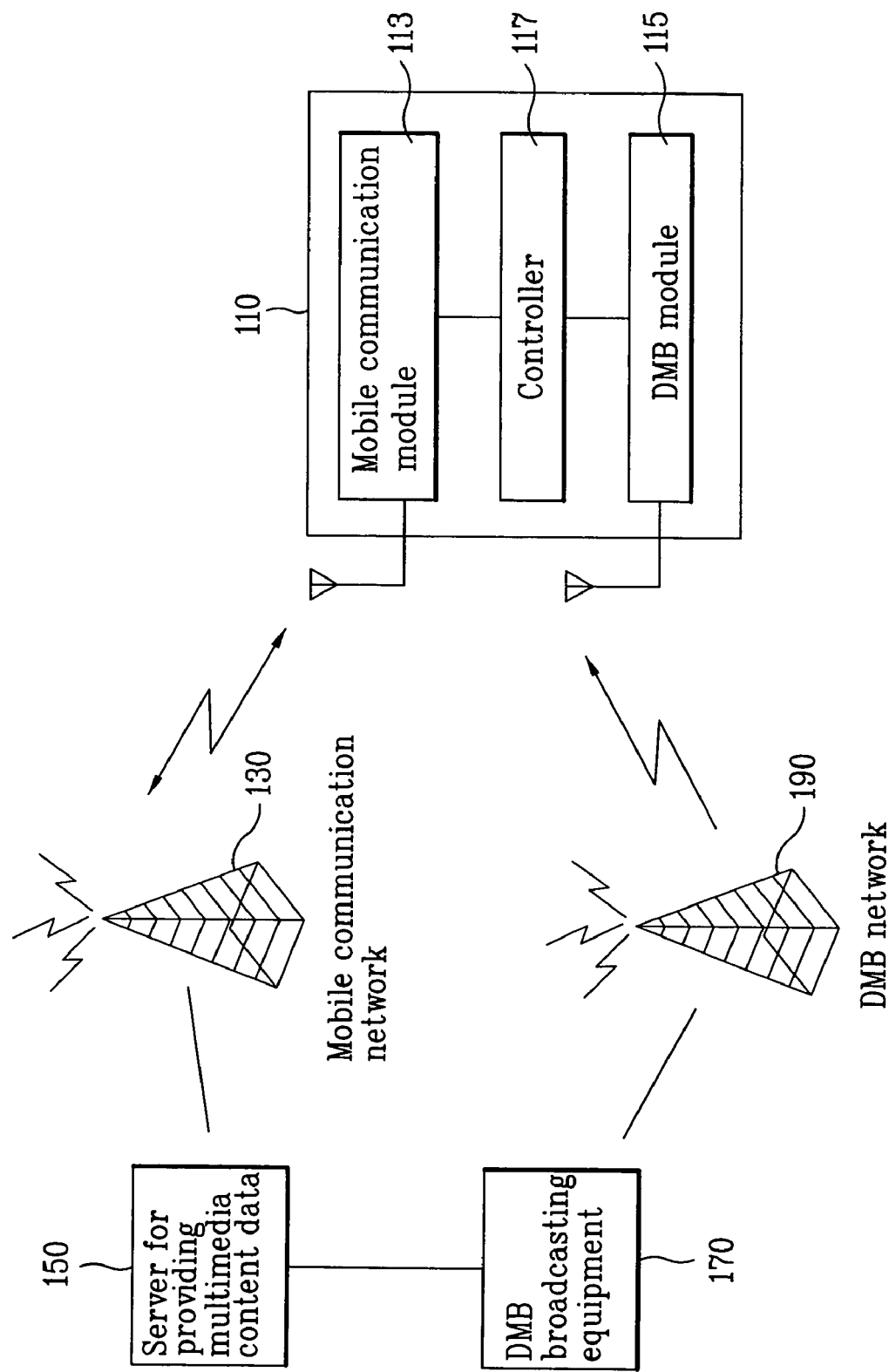
FIG. 1 is a block diagram illustrating a system for downloading multimedia content data according to the present invention.

Reference will now be made in detail to the preferred embodiments of the present invention, examples of which are illustrated in the accompanying drawings. Wherever possible, the same reference numbers will be used throughout the drawings to refer to the same or like parts.

It should be noted that the present invention uses a broadcast network for downloading data, especially high-capacity data such as multimedia content data (e.g., MP3, music video, and movie, etc.). Preferably, the present invention uses a mobile broadcast network capable of receiving broadcast data while in motion.

The term "mobile broadcast" is indicative of a variety of mobile multimedia broadcast services (e.g., a MediaFlo service of the United States, a DMB (Digital Multimedia Broadcasting) service of the Republic of Korea, and a DVB-H service of Europe, etc.). Typically, the mobile broadcast provides users with a multi-channel multimedia broadcast service and a high-speed digital data service, such that the users can receive desired broadcast data via mobile phones, PDAs, or receivers for vehicles, etc. while in motion.

It should be noted that the present invention is designed to download high-capacity data using the above-mentioned data services of the mobile broadcast.

For the convenience of description and better understanding of the present invention, it is assumed that the present invention exemplarily shows a method for downloading multimedia content data over the DMB network of the Republic of Korea, however, it should be noted that the present invention is not limited to the above-mentioned DMB network or multimedia content data, and can be applied to all of broadcast networks capable of providing data services as necessary, such that it can download high-capacity data.

A preferred embodiment of the present invention will hereinafter be described with reference to FIGS. 1 and 2.

FIG. 1 is a block diagram illustrating a system for downloading multimedia content data according to the present invention. FIG. 2 is a flow chart illustrating a method for downloading multimedia content data according to the present invention.

Referring to FIGS. 1 and 2, a user of the mobile communication terminal 110 gains access to a content server 150 for providing multimedia content data over the Internet via a mobile communication network 130.

The user's access to the content server 150 over the mobile communication network is facilitated by a mobile communication module 113 of the mobile communication terminal 110, which is controlled by a controller 117 of the mobile communication terminal 110. The content server 150 provides the terminal user with a list of multimedia content data (e.g., MP3, music video, and movie, etc.) possessed by the server, and the user selects desired multimedia content data from among the list of multimedia content data at step S201.

Then, the content server 150 reserves a transmission schedule for transmitting the selected multimedia content data to the user over a DMB data channel of a DMB network 190 at step S203. Data is not selectively applied to only a specific person via the DMB data channel, and is simultaneously applied to unspecified users who register as members in a DMB service, such that it is necessary to reserve a transmission (TX) schedule indicating what time or how long the selected multimedia content data will be transmitted to unspecified users.

The content server 150 generates an encryption key (also called an encoding key) associated with the selected multimedia content data at step S203. The content server 150 transmits the reserved transmission (TX) schedule and the encryption key to the mobile communication terminal 110 over the mobile communication network 130 at step S205.

The mobile communication terminal 110 receives/stores the encryption key and the transmission (TX) schedule at step S207.

The encryption key is employed when the mobile communication terminal 110 reproduces received multimedia content data. The transmission (TX) schedule controls the mobile communication terminal 110 to automatically receive the multimedia content data at a date and/or time according to the transmission (TX) schedule.

In the meantime, we can imagine a case where the selected multimedia content data for the user has been also already selected by a third party before the user's selection, such that a transmission (TX) schedule/an an encryption key for the above-mentioned multimedia content data has been already reserved/generated for the third party.

In this case, the content server 150 uses the reserved transmission (TX) schedule as a transmission (TX) schedule for the user.

In other words, the content server 150 transmits the already reserved transmission (TX) schedule and the already generated encryption key for the third party, to the user. As a result, although several users repeatedly desire to download the same multimedia content data, the content server 150 makes the users to simultaneously download the same multimedia content data, such that a data channel of the DMB network 190 can be more effectively used.

Thereafter, the content server 150 encrypts (or encodes) the selected multimedia content data using the encryption key at step S209. If a current time reaches a predetermined transmission (TX) time reserved by the transmission (TX) schedule, the content server 150 transmits the encrypted multimedia content data to a DMB broadcast equipment 170. The DMB broadcast equipment 170 transmits the above-mentioned multimedia content data to unspecified users over the DMB data channel of the DMB network 190 at step S211.

However, the unspecified users other than the above-mentioned user do not have the encryption key, so that they cannot decode/reproduce the encrypted multimedia content data, only the above-mentioned user who has already received the above-mentioned encryption key over the mobile communication network can receive/decode/reproduce the encrypted multimedia content data.

Thereafter, the mobile communication terminal 110 receives the above-mentioned multimedia content data transmitted via the DMB data channel at step S211. Therefore, it is preferable that the mobile communication terminal 110 is implemented with a DMB terminal including a DMB module 115, and the DMB module 115 receives data over the DMB data channel. The DMB module 115 is controlled by the controller 117 of the mobile communication terminal 110

In the meantime, if the above-mentioned multimedia content data is completely received, the mobile communication terminal 110 transmits a reception (RX) completion message of the multimedia content data to the content server 150 over the mobile communication network 130 at step S213.

The content server 150 repeatedly transmits the above-mentioned multimedia content data over the DMB data channel during a transmission (TX) time based on the transmission (TX) schedule until receiving the reception (RX) completion message.

If the multimedia content data is transmitted to a plurality of users according to the same transmission (TX) schedule, the content server 150 repeatedly transmits the multimedia content data until receiving reception (RX) completion messages from all the users.

Therefore, if the content server 150 receives the reception (RX) completion messages from the user or all users within the transmission (TX) time, it stops transmitting the multimedia content data, and uses the remaining TX time to reserve/transmit other multimedia content data for other users.

However, if the TX time elapses, the content server 150 stops transmitting the multimedia content data irrespective of reception of the RX completion message, and transmits the next scheduled multimedia content data according to the TX schedule at step S215.

The mobile communication terminal 110 decodes the encrypted multimedia content data received via the DMB network 190 using the encryption key received via the mobile communication network 130, and stores the decoded multimedia content data at step S217. The mobile communication terminal 110 reproduces the stored multimedia content data for the terminal user as necessary.

As apparent from the above description, the method and system for downloading multimedia content data according to the present invention have the following effects.

Firstly, the present invention allows a user to download multimedia content data over a data channel of the DMB network, instead of the Internet of a mobile communication network, such that it can greatly reduce Internet charges for downloading the multimedia content data as compared to the conventional art.

Secondly, if a plurality of users attempts to download the same multimedia content data, the present invention can simultaneously transmit the multimedia content data to the users whereas the conventional art must repeatedly transmit the multimedia content data to individual users, such that it improves use efficiency of a network acting with limited resources.

Thirdly, the multimedia content provider can provide the users with the multimedia content data at low prices, resulting in increased economical efficiency.

It is obvious to those skilled in the art that the present invention can be modified into other specific formats without departing from the spirit or scope of the inventions.

For example, although the present invention has exemplarily disclosed the method/system for downloading multimedia content data over the DMB network, it is obvious to those skilled in the art that the present invention may be adapted to download the multimedia content data over any other broadcast network capable of transmitting other data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for downloading data in a mobile communication terminal comprising the steps of:
   a) selecting a desired data over a mobile communication network; and
   b) downloading to the mobile communication terminal the selected data over a broadcast network, wherein the selected data had previously been selected for downloading by a third party, and the downloading to the mobile communication terminal occurs based upon a transmission schedule that has been reserved for the third party for the downloading of the selected data, wherein the reserving of the transmission schedule occurs after the selected data had been selected for downloading by the third party.

2. The method according to claim 1, further includes the step of:
   receiving an encryption key corresponding to the selected data over the mobile communication network.

3. The method according to claim 2, further includes the step of:
   decoding the downloaded data using the received encryption key.

4. The method according to claim 1, further comprising the step of:
   reserving the transmission schedule of the selected data over the mobile communication network.

5. The method according to claim 2, wherein the broadcast network is a mobile broadcast service network, and the selected data of the step b) is downloaded over a data channel of the mobile broadcast service network.

6. A method for downloading data comprising the steps of:
   a) accessing a server to select a desired data over a mobile communication network by a mobile communication terminal;
   b) reserving a transmission schedule of the data by the server;
   c) transmitting the selected data over a broadcast network based on the transmission schedule by the server, and
   d) receiving the data over the broadcasting network by the mobile communication terminal, and upon completely receiving the data, transmitting a reception completion message indicating the completely-received state of the data to the server over the mobile communication network by the mobile communication terminal, and
   wherein the step c) includes the steps of:
   repeatedly transmitting the data until receiving the reception completion message from the mobile communication terminal by the server; and
   if the selected data is transmitted to the mobile communication terminal and a third party, repeatedly transmit the data until receiving the reception completion message from the mobile communication terminal and the third party.

7. The method according to claim 6, wherein the step b) includes the step of:
   if the data selected by the mobile communication terminal has been already selected by the third party, using a transmission schedule already reserved for the third party as a transmission schedule for the mobile communication terminal.

8. The method according to claim 6, wherein the step b) further includes the step of:
   generating an encryption key corresponding to the selected data by the server.

9. The method according to claim 8, wherein the step b) further includes the step of:
   transmitting the encryption key and/or the transmission schedule to the mobile communication terminal over the mobile communication network.

10. The method according to claim 9, wherein the step c) includes the step of:
    encrypting the data using the encryption key by the server and transmitting the data.

11. The method according to claim 10, wherein the step d) further includes the step of:
    decoding the received data using the encryption key by the mobile communication terminal.

12. The method according to claim 9, wherein the step d) includes the step of:
    automatically receiving the data based on the received transmission schedule by the mobile communication terminal.

13. The method according to claim 6, wherein the step c) includes the step of:
if a transmission time according to the transmission schedule expires, stopping transmitting the data by the server even though the reception completion message is not completely received from the mobile communication terminal.

14. The method according to claim 6, wherein:
the broadcast network is a mobile broadcast service network, and the server of the step c) transmits the selected data over a data channel of the mobile broadcast service network.

15. A system for downloading data comprising:
a server for providing a variety of data; and
a mobile communication terminal for accessing to the server to select a desired data over a mobile communication network and downloading the selected data over a broadcast network, and upon completely receiving the data, transmitting a reception completion message indicating the completely-received state of the data to the server over the mobile communication network by the mobile communication terminal, and
wherein the server is further configured to:
repeatedly transmit the data until receiving the reception completion message from the mobile communication terminal; and
if the selected data is transmitted to the mobile communication terminal and a third party, the server repeatedly transmits the data until receiving the reception completion message from the mobile communication terminal and the third party.

16. A mobile communication terminal for downloading data comprising:
a mobile communication module for accessing a server capable of providing the data over a mobile communication network, and selecting a desired data from the server; and
a mobile broadcast module for downloading the selected data over a mobile broadcast service network, wherein the selected data had previously been selected for downloading by a third party, and the downloading to the mobile communication terminal occurs based upon a transmission schedule that has been reserved for the third party for the downloading of the selected data, wherein the reserving of the transmission schedule occurs after the selected data had been selected for downloading by the third party.

17. A method for downloading data in a mobile communication terminal, the method comprising:
selecting a desired data over a mobile communication network, wherein the selected data is also selected for downloading by a third party; and
downloading to the mobile communication terminal the selected data over a broadcast network, wherein the downloading to the mobile communication terminal occurs based upon a transmission schedule that has been reserved by the third party for the downloading of the selected data, wherein the reserving of the transmission schedule occurs after the selected data had been selected for downloading by the third party.

* * * * *